United States Patent [19]

Nishikawa

[11] Patent Number: 4,736,246

[45] Date of Patent: Apr. 5, 1988

[54] STEREOSCOPIC VIDEO DISPLAY SYSTEM

[75] Inventor: Susumu Nishikawa, Kanagawa, Japan

[73] Assignee: Sony Corporation, Tokyo, Japan

[21] Appl. No.: 24,707

[22] Filed: Mar. 11, 1987

[30] Foreign Application Priority Data

Mar. 12, 1986 [JP] Japan ................................. 61-54432

[51] Int. Cl.$^4$ ............................................. H04N 9/54
[52] U.S. Cl. ........................................ 358/88; 358/91; 358/92
[58] Field of Search ................. 358/88, 89, 91, 92, 358/3, 140, 152

[56] References Cited

U.S. PATENT DOCUMENTS 4,562,463 12/1985 Lipton .................................... 358/88

FOREIGN PATENT DOCUMENTS 0168484 12/1981 Japan .................................... 358/88
0139589 8/1983 Japan ..................................... 358/3
WO83/02706 8/1983 PCT Int'l Appl. .
2173667 10/1986 United Kingdom .

OTHER PUBLICATIONS

"Stereoscopic Television"; Sziklai; RCA Publication, Jul. '50.

Primary Examiner—Howard W. Britton
Assistant Examiner—Victor R. Kostak
Attorney, Agent, or Firm—Hill, Van Santen, Steadman & Simpson

[57] ABSTRACT

A stereoscopic video display system is disclosed, in which an interlaced scanning picture information for a viewer's left eye and an interlaced scanning picture information for the viewer's right eye are doubled in frequency and displayed alternately on a monitor display at the field rate. Also, left and right visual fields of the viewer are shut off alternately by glasses with a shutter mechanism in synchronism with a field period and a start time point and an end time point of the vertical deflection are selected properly in such a manner that the monitor display may carry out the interlaced scannings for each of the left eye and the right eye. Thus, the left and right pictures are displayed in the interlaced scanning manner, respectively and the quality of the reproduced picture will have superior clarity and characteristics.

4 Claims, 5 Drawing Sheets

FIG. 2A  L                R  FIG. 2B
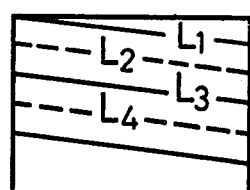 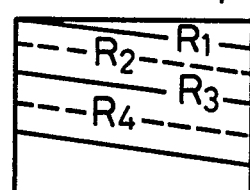
FIG. 2C                      FIG. 2D
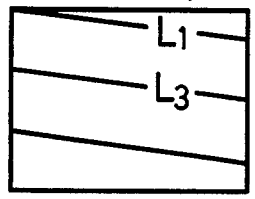 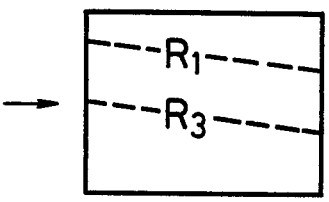
First Field I    Second Field II
FIG. 2E                      FIG. 2F
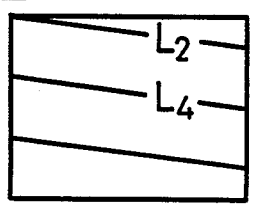 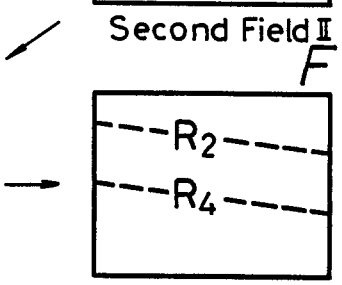
Third Field III    Fourth Field IV
FIG. 2G  II            II  FIG. 2H
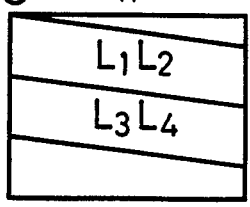 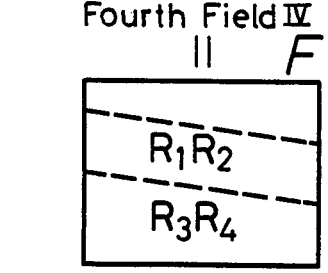

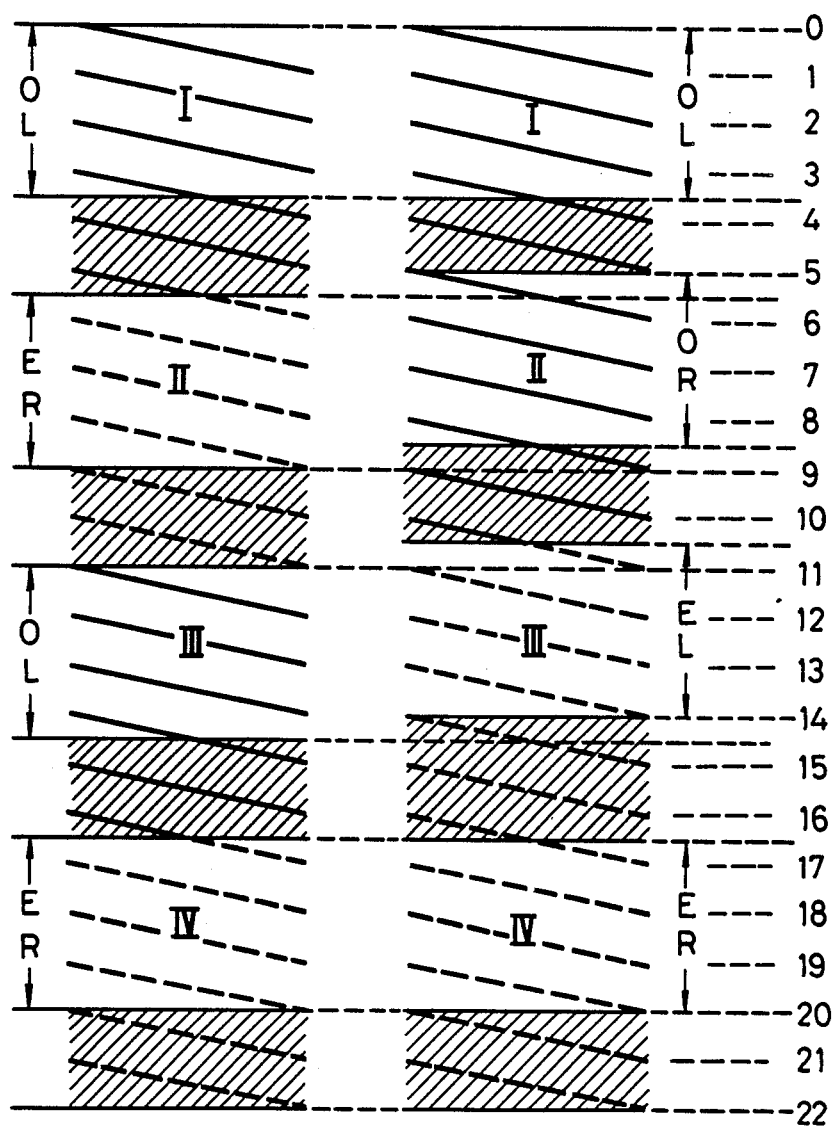

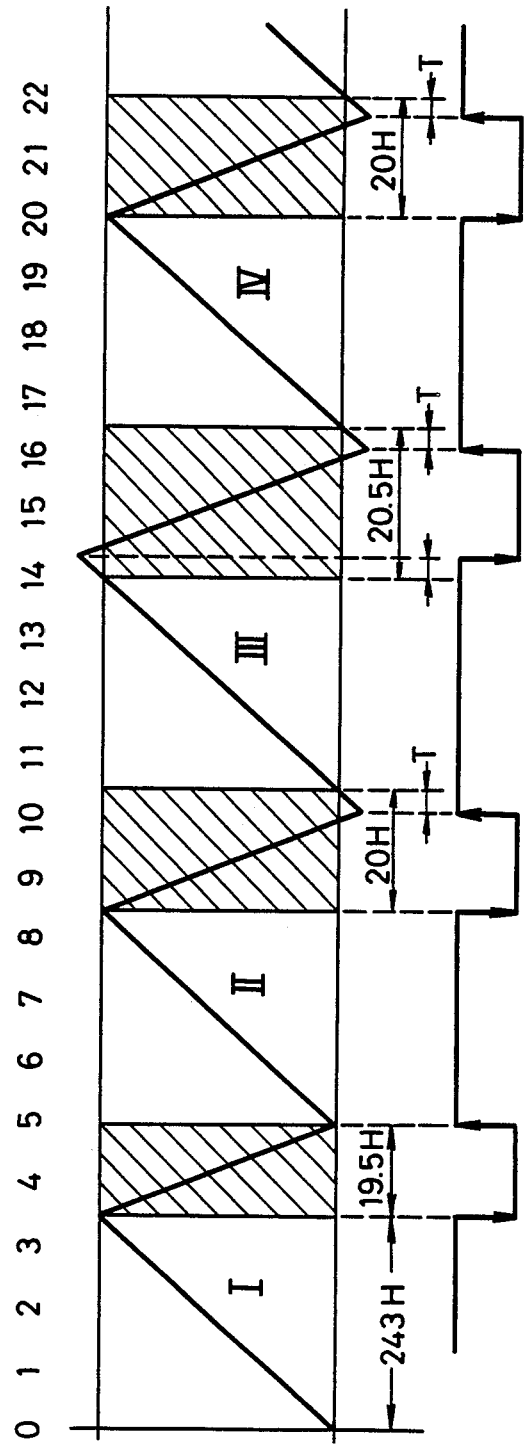

FIG. 6A  L 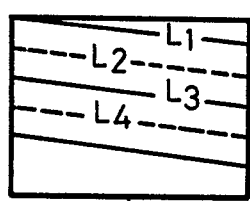
R  FIG. 6B 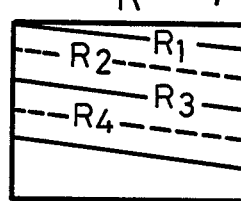
LINE-FREQ. DOUBLER AND TIME-AXIS MULTIPLEXER

FIRST FIELD I

SECOND FIELD II

THIRD FIELD III

FOURTH FIELD IV

STEREOSCOPIC VIDEO DISPLAY SYSTEM

BACKGROUND OF THE INVENTION

1. Field of the Invention

The present invention relates generally to a video display system and, more particularly, is directed to a stereoscopic video display system in which a television picture which is to be displayed on a cathode ray tube (CRT) or a monitor display can be viewed stereoscopically.

2. Description of the Prior Art

In order to view a television picture displayed on a cathode ray tube (monitor display) stereoscopically, the following system is known. Two video or television cameras located with a spacing nearly equal to the spacing between the human eyes are utilized to generate picture information for a left eye (left signal) and picture information for a right eye (right signal), respectively. The two television cameras are driven in synchronism to provide horizontal and vertical deflections. The left signal is displayed on the monitor as the odd field (hereinafter simply referred to as an O field) and the right signal is displayed as the even field (hereinafter simply referred to as an E field). For viewing, a viewer puts on glasses with a shutter mechanism and the shutters for each eye in the glasses are opened and/or shut off alternately at the above mentioned field period (1/30 seconds in the standard television system) by the shutter mechanism.

According to the prior art stereoscopic video display system, the left and right pictures are alternately reproduced on the picture screen of a monitor display at every 30 Hz repetitively so that flicker becomes conspicuous on the picture screen.

In order to remove such defect, the following system has been proposed. As shown in FIG. 1, the left signal L and the right signal R obtained from two different television cameras are multiplexed in the time axis, or doubled in the line frequency and the left signal L and the right signal R are displayed on the monitor display during one vertical driving period of the television camera, that is during one field period (as shown by V in FIG. 1). References I, II, III, IV, ... in FIG. 1 designate, respectively, a first field, a second field, a third field, a fourth field, ... which are displayed on the monitor display at every ½ V period.

This previously proposed stereoscopic video display system, however, has defects which will be explained below.

FIGS. 2A to 2H illustrate conditions of the scanning lines provided by this prior art stereoscopic video display system, respectively. FIG. 2A shows the scanning lines obtained from a television camera of a left signal (L) system and FIG. 2B shows the scanning lines obtained from a television camera of a right signal (R) system. The television cameras carry out the scanning in the interlaced scanning manner in synchronism with each other. These scanning lines are respectively marked sequentially with references L1, L2, L3, ... and R1, R2, R3, ... Throughout FIGS. 2A to 2H, a solid line represents the O (odd field) and a broken line represents the E (even) field.

The left signal L and the right signal R are both supplied to a line-frequency doubler M and thereby horizontal and vertical periods of these left signal L and right signal R become ½ the horizontal and vertical deflection driving periods H and V of the television cameras, that is, the left signal L and the right signal R are both doubled in frequency and are then displayed on the monitor display. FIGS. 2C to 2F illustrate the conditions in which each of the display periods in FIGS. 2C to 2F is ½ the display period of FIGS. 2A to 2B.

The left signal L in the O field as shown in FIG. 2A is displayed on the monitor display during the period of the first field I (¼ V) (O field period on the monitor display) as shown in FIG. 2C. The right signal R in the O field as shown in FIG. 2B is displayed on the monitor display during the period of the second field II (¼ V) (E field period on the monitor display) as shown in FIG. 2D. Further, the left signal L in the E field as shown in FIG. 2A is displayed on the monitor display during the period of the third field III (O field period on the monitor display) as shown in FIG. 2E. Then, the right signal R in the E field as shown in FIG. 2B is displayed on the monitor display during the period of the fourth field IV (E field on the monitor display) as shown in FIG. 2F. As a result, with respect to the left signal L, the picture on the scanning line L1 and the picture on the scanning line L2 as shown in FIG. 2A and also those on the scanning lines L3 and L4 overlap as shown in FIG. 2G. Also, in the right signal R, similar results occur as shown in FIG. 2H and thus the quality and resolution of the picture is substantially deteriorated.

In this case, it is easy to double the left signal L and the right signal R in frequency by sequentially writing the left signal L and the right signal R in field memories of the left signal (L) system and the right signal (R) system and by reading the signals out therefrom at a speed which is twice the writing speed.

OBJECTS AND SUMMARY OF THE INVENTION

Accordingly, it is a general object of this invention to provide an improved stereoscopic video display system.

It is an object of this invention to provide a stereoscopic video display system in which interlaced scanning can be positively carried out for a picture for the left eye and a picture for the right eye by suitably selecting the starting time and the ending time of the vertical deflection so that the reproduced picture has high quality and can be viewed stereoscopically.

It is another object of this invention to provide a stereoscopic video display system which prevents flicker from becoming conspicuous in a reproduced picture.

It is a further object of this invention to provide a stereoscopic video display system which considerably improves the quality of the reproduced picture.

According to one aspect of the present invention, there is provided a stereoscopic video display system, comprising:

(a) means for frequency-doubling input interlaced informations for a viewer's left and right eyes, respectively;

(b) means for displaying frequency-doubled interlaced informations on a picture display device alternately at a field rate;

(c) means for alternately interrupting the viewer's left and right eyes in synchronism with the field period; and (d) means for correcting the deflection such that each of the scannings for the viewer's left and right eyes have interlaced scanning.

These and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIGS. 2A to 2H are diagrams, respectively, used to explain the scanning lines of a prior art stereoscopic video display system;

FIGS. 4A to 4B are diagrams respectively used to explain the interlaced scanning;

FIG. 5 is a waveform diagram showing a current waveform and a vertical synchronizing signal waveform for the vertical deflection; and FIGS. 6A to 6H are diagrams respectively used to explain the interlaced scanning of the present invention.

DESCRIPTION OF THE PREFERRED EMBODIMENTS

An embodiment of a stereoscopic video display system according to the present invention is described with reference to FIG. 3.

Figure 3:
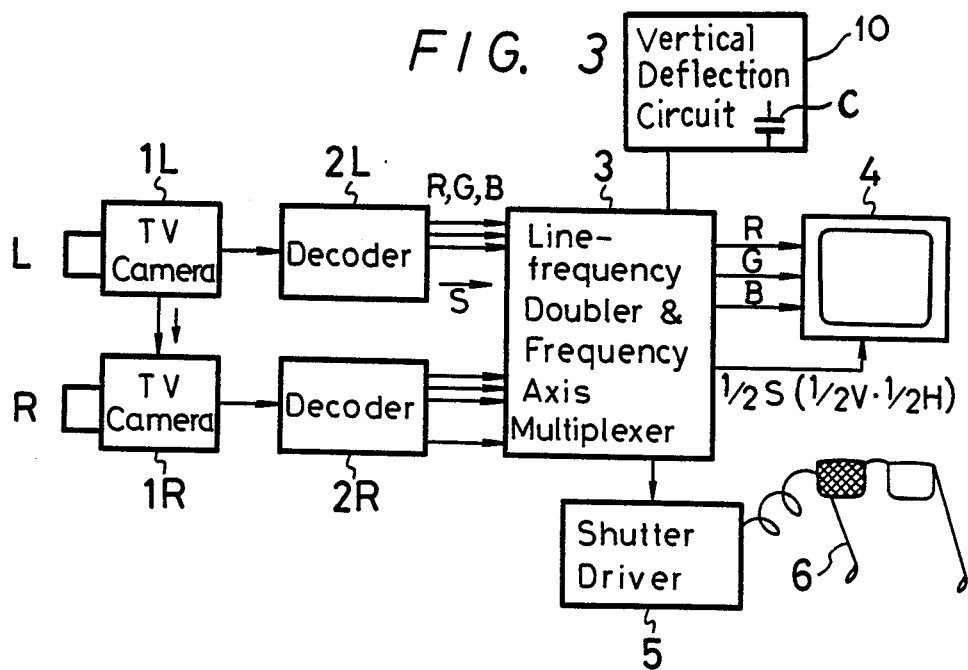
FIG. 3 is a block diagram showing an embodiment of a stereoscopic video display system according to the present invention.

FIG. 3 shows a television camera 1L for a human left eye and a television camera 1R for the human right eye, respectively. The left signal L and the right signal R from the television cameras IL and IR are, respectively, supplied to decoders 2L and 2R from which color signals R, G, B and synchronizing signals S are, respectively, derived. The color signals R, G, B and the synchronizing signals S are fed to a line-frequency doubler/time axis multiplexer 3. The frequencies of the horizontal and vertical drive signals obtained from the decoders 2L and 2R are equal to those of the television cameras 1L and 1R and are represented as H and V, respectively.

Figure 1:
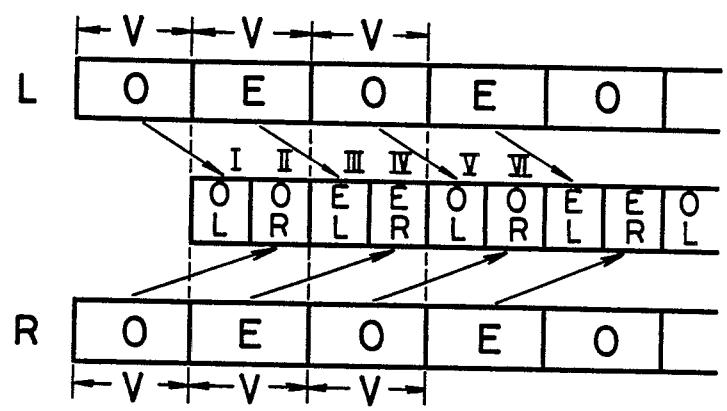
FIG. 1 is a schematic representation used to explain the multiplex time axes of a prior art stereoscopic picture.

The left signal L and the right signal R are supplied to the line-frequency doubler/time axis multiplexer 3 in which both of them are multiplexed on the time axis, and doubled in line-frequency and are then supplied to a monitor display 4. The fundamental construction of the line-frequency doubler/time axis multiplexer 3 produces the results shown in FIG. 1.

However, according to the present invention, as shown in FIGS. 4 and 5, a starting point and an ending point of the vertical deflection are properly selected as will be later described.

Referring back to FIG. 3, there is provided a shutter driver 5 which receives the output from the line-frequency doubler/time axis multiplexer 3 and which drives a shutter mechanism of for glasses 6 such that the left eye glass and the right eye glass are alternately shut off during every vertical period V.

FIGS. 4A and 4B are diagrams respectively showing the relationship among the odd field O, the even field E and the vertical retrace period (which is shown by the hatched area in FIGS. 4A and 4B) where the horizontal scanning line (the horizontal retrace is omitted) is used as the standard FIG. 4A shows the case of the normal interlaced scanning (with a doubled speed) and FIG. 4B illustrates the case of the embodiment of this invention.

For better understanding, the horizontal periods are each respectively marked with time points 0, 1, 2, 3, . . . 22. As is well known, in the case of FIG. 4A, the O field and the E field are alternately repeated and the left signal R is displayed only in the O field and the right signal R is displayed only in the E field.

According to the embodiment of the invention, in order that the first field I ($\frac{1}{2}$ V) and the second field II ($\frac{1}{2}$ V) will constitute the O field scanning lines, as shown in FIG. 4B, the starting time of the second field II is selected to be earlier than that of FIG. 4A, in other words, the first retrace period is selected to be short in duration as compared with that of FIG. 4A, and the ending time of the second field II is selected to start earlier than that of FIG. 4A, and the ending time is selected to be earlier than that of FIG. 4A. In other words, if the vertical retrace period is increased or decreased by each 0.5H by the above control, it is possible to sequentially construct the respective fields in the order of O, O, E, E, O, O, E, . . . type scanning lines. In addition, the pictures based on the left signal L and the right signal R can be alternately displayed on the monitor display 4. The tracing periods of the O field and the E field are equal to each other and also equal to those shown in FIG. 4A. Consequently, it should be understood that only the retrace period becomes irregular in this embodiment of the invention.

In order to generate a deflection waveform signal, generally it is necessary to employ a charge and discharge circuit that uses a capacitor. Accordingly, in order to alter the above mentioned vertical retrace period, the discharge time constant (or a charge time constant) of the charge and discharge circuit in response to these periods can be done. However, such circuit arrangement is complicated.

Therefore, according to the embodiment of this invention, it is possible to achieve the above mentioned object or purpose by properly selecting the charge starting time, the discharging start time of the capacitor or both of them without altering the charge and discharge time constants of the capacitor as shown in FIG. 5. Since the charge and discharge time constants of the capacitor are not altered as described above, the slope and curve of the rising up curves shown as ascending to the right in FIG. 5 are all equal and the slope and curve of the falling down curves shown as descending to the right are also all equal. In FIG. 5, the return periods are indicated by the hatched areas, while the areas that are not hatched are the trace periods of the O field and the E field and the trace periods are equal to one another as described above.

If now the shortest retrace period is selected as 19.5 H, the increased amount (T in FIG. 5) of the return period is expressed by the following equation.

$$T = \frac{(262.5 - 19.5) \times 0.5H}{262.5} = 0.463H$$

Consequently, if such timing information is stored in the line-frequency doubler/time axis multiplexer 3, it becomes possible to increase the second, third and fourth return periods, that is, to carry out the display described in connection with FIG. 4B.

A capacitor C in the vertical deflection circuit 10 of the circuit 3 is controlled so that the deflection is corrected by suitably selecting the charge starting time or a discharge starting time of the capacitor C of the charging and discharge circuit in vertical deflection circuit 10.

Figure 6C:
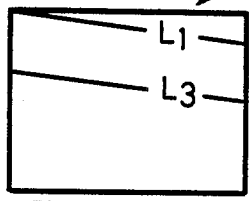
Figure 6D:
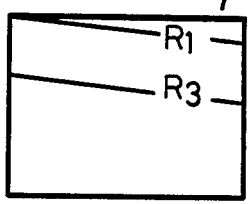
Figure 6E:
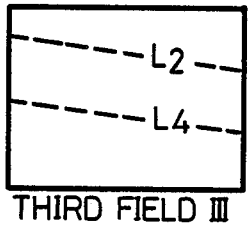
Figure 6F:
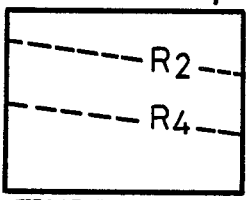
Figure 6G:
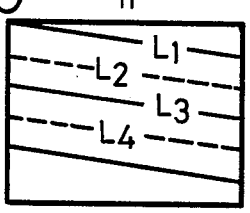
Figure 6H:
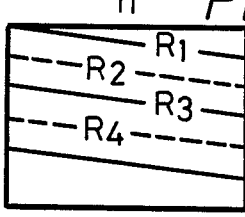

FIGS. 6A to 6H are diagrams, respectively, showing the thus obtained pictures by the horizontal scanning lines. FIGS. 6A to 6H correspond, respectively, to FIGS. 2A to 2H which were used to explain the prior art stereoscopic video display system. Throughout FIGS. 6A to 6H, like parts corresponding to those of FIGS. 2A to 2H are marked with the same references. According to the embodiment of this invention, the left signal L and the right signal R shown in FIG. 4B are displayed sequentially on the monitor display 4 (FIG. 3). In this case, the respective fields have O, O, E, E, . . . type scanning patterns sequentially, and the interlaced scannings are carried out with respect to the left signal L and the right signal R so that as shown in FIGS. 6G and 6H, the left and right picutres which are perfectly interlaced can be obtained. Thus, it is possible to remove the defects of the prior art previously discussed in relation to FIGS. 2G and 2H.

According to the present invention, it is possible to remove the defects encountered with the prior art stereoscopic video display system described in connection with FIGS. 2A to 2H. In other words, it is possible to positively carry out the interlaced scanning of the pictures for the viewer's left eye and right eye as shown in FIGS. 6A to 6H. Thus, the stereoscopic video display system of the invention can reproduce a picture without flicker and can improve the quality of the reproduced picture.

The above description is given for a single preferred embodiment of the invention but it will be apparent that many modifications and variations could be effected by one skilled in the art without departing from the spirit or scope of the novel concepts of the invention so that the scope of the invention should be determined only by the appended claims.

I claim as my invention:

1. A stereoscopic video display system, comprising: means for frequency-doubling interlaced input information for a viewer's left and right eyes, respectively; means for displaying frequency-doubled interlaced information on a picture display device alternately at a field rate; means for alternately interrupting the viewer's left and right eyes in synchronism with the field period; means for correcting the deflection such that each of the scannings for said viewer's left and right eyes are interlaced, wherein the starting time and the ending time of the vertical deflection are selected such that an odd field pattern is repeated twice and an even field pattern is repeated twice, wherein trace periods of successive fields are selected to be equal to each other; and, wherein the retrace periods between two successive fields are selected to be different.

2. A stereoscopic video display system, comprising: means for frequency-doubling interlaced input information for viewer's left and right eyes, respectively; means for displaying frequency doubled interlaced information on a picture display device alternately at a field rate; means for alternately interrupting the viewer's left and right eyes in synchronism with the field period; and means for correcting the deflection such that each of the scannings for said viewer's left and right eyes are interlaced, and wherein the deflection is corrected by suitably selecting a charge starting time or a discharge starting time of a capacitor of a charging and discharging circuit in a vertical deflection circuit.

3. A stereoscopic video display system as claimed in claim 2, wherein both of the charge starting time and discharge starting time of said capacitor are properly selected.

4. A stereoscopic video display system as claimed in claim 1, wherein the retrace periods between two successive fields are selected to be different by 0.5 H where H is one horizontal line period.

* * * * *